United States Patent Office 3,781,242
Patented Dec. 25, 1973

3,781,242
LIGHT STABILIZED POLYPROPYLENE CONTAIN-
ING A HINDERED PHENOL, A PHOSPHITE AND
A BENZOTRIAZOLE
Ronald D. Mathis, Taylors, S.C., and Jack P. Guillory,
Bartlesville, Okla., assignors to Phillips Petroleum
Company
No Drawing. Filed Feb. 17, 1972, Ser. No. 227,252
Int. Cl. C08f 45/58
U.S. Cl. 260—45.7 P               1 Claim

ABSTRACT OF THE DISCLOSURE

Polymeric compositions are stabilized against degradation in physical and chemical properties from exposure to actinic radiation by incorporating into such compositions an additive system comprising at least one secondary organic phosphite ester in combination with at least one 2-(2'-hydroxy-5'-alkylphenyl)benzotriazole. Optionally, the stabilizer additive systems further comprise hindered phenols.

---

This invention relates to chemical compositions. More particularly, the invention relates to polymeric compositions and the stabilization of such compositions against degradation in physical and chemical properties resulting from exposure to actinic radiation such as light and ultraviolet light.

Generally, polymeric materials are subject to degradation of physical and chemical properties during manufacture, storage, processing and use. To overcome, or at least inhibit, such degradation, there have been developed additive systems with the intent of stabilizing polymeric materials against degradation in physical and chemical properties through exposure to environmental conditions. Although many of the stabilizer systems are presently in commercial use, none are entirely free of defect. As a consequence, there is a continuing search for new stabilizer systems which might be effective in overcoming the deficiencies of those presently in use, whether such use be of a general or special nature.

A principal cause of such degradation in properties is actinic radiation and, in particular, ultraviolet radiation. While the primary source of ultraviolet radiation is the sun, the problem of protecting organic materials against this source of ultraviolet light is not limited only to materials which are in direct exposure to sunlight since all organic materials during sunlight hours are subjected to some degree to the effects of ultraviolet light whether in direct exposure to sunlight or not.

Additive systems which have been developed to at least inhibit the degradation of polymeric materials from exposure to actinic radiation include both single and multiple component systems. The protective action afforded by such additive systems is generally considered to be a function of their efficiency in absorbing ultraviolet light and/or an intermolecular energy process with the energy being harmlessly dissipated. Although the ability to provide a proper spectral response is a principal requirement of ultraviolet light stabilizer additives, other properties also are necessary in practice These include heat stability, low color, compatibility and low volatility. A requirement from the commercial standpoint is low manufacturing cost. Since many of the individual compounds which are effective as stabilizers against actinic radiations are so at the expense of other properties, the multiple component systems were developed to provide a more balanced stabilization effect. Quite often, however, the utilization of multiple component stabilizer systems has resulted in an inhibiting effect of one on the other, particularly in extending the use of such systems to a variety of polymeric materials. Predictions of individual stabilizers is itself difficult because of the many factors and variables one must contend with in attempting to find a balanced and compatible system. At least as difficult is the determination of whether or not a given combination of two or more stabilizer additives, even when the effect of each is known, will necessarily provide a desired stabilizing effect in particular polymeric materials. Manifestly, there is still a need for effective stabilizer systems, which can provide a desired level of protection against actinic radiation either in a variety of polymeric materials or in specific instances.

In accordance with the present invention, it has been discovered that inhibition of deterioration and degradation of chemical and physical properties as a result of exposure to actinic radiation such as light and ultraviolet light in a wide variety of polymeric materials can be substantially improved by incorporating into such materials an additive system comprising at least one secondary organic phosphite ester in combination with at least one of certain 2-(2'-hydroxyphenyl)benzotriazoles. In a preferred embodiment, the resistance of such materials to degradation of physical and chemical properties through exposure to heat as well as light can be materially enhanced by the incorporation of a hindered phenol into the additive systems of the present invention.

The stabilizer additive systems as described herein are suitable for stabilizing a wide variety of polymeric compositions against degradation of physical and chemical properties as a result of exposure to actinic radiation. The additive systems of the present invention are useful for the stabilization of homopolymers and copolymers of mono-1-olefins, including aliphatic and aryl-substituted aliphatic monoolefins, containing from 2 to 12 carbon atoms, and including copolymers of at least one such monoolefin and at least one other monomer copolymerizable therewith; homopolymers and copolymers of conjugated dienes having from 4 to 12 carbon atoms, and including copolymers of at least one such diene and at least one other monomer copolymerizable therewith; polymers and copolymers of vinyl monomers selected from the group consisting of vinyl halides, vinylidene chloride, vinyl acetate, styrene and acrylonitrile, and including copolymers of at least one such vinyl monomer and at least one other monomer copolymerizable therewith; butadiene-styrene-acrylonitrile terpolymers; acrylates and methacrylate polymers and copolymers; polyurethanes; acetal polymers and copolymers; polycarbonates; polyesters formed by the esterification of polycarboxylic acids or their anhydrides with polyhydric alcohols; polyamides; epoxy resin; and the like. Polymer blends, i.e., physical admixtures of two or more polymers, may also be stabilized in accordance with the present invention.

The additive systems of the present invention are particularly useful for the stabilization of polyesters and mono-1-olefinic polymers and copolymers. Representative of such polyolefinic materials are homopolymers of ethylene, propylene, butene-1, isobutylene, pentene-1, hexene-1, 4-methyl-pentene-1, dodecene-1, and the like; copolymers such as ethylene-propylene copolymer, ethylene-butene-1 copolymer, 4-methylpentene-1-hexene-1 copolymer, and the like; and ethylene-propylene-diene rubbers wherein the diene is 1,4-hexadiene, 2-methyl-1,4-hexadiene, dimethyl-1,4,9-decatriene, dicyclopentadiene, vinyl cyclohexene, vinyl norbornene, vinylidene norbornene, methylene norbornene, norbornadiene, methyl norbornadiene, methyl tetrahydroindene, and the like. As noted, blends of suitable polymers can be used if desired.

The secondary organic phosphite esters which are suitable for use in the practice of the invention are characterized by the formula:

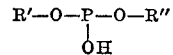

wherein R' and R" are hydrocarbon radicals and each individually is selected from the group consisting of alkyl, aryl, cycloalkyl, and combinations thereof such as alkaryl and aralkyl having 1 to 20 carbon atoms. Exemplary compounds include di-2-ethylhexyl phosphite, diphenyl phosphite, dibutyl phosphite, dioctyl phosphite, butyl octyl phosphite, didodecyl phosphite, dicyclohexyl phosphite, dicyclooctyl phosphite, dibenzyl phosphite, dimethyl phosphite, dieicosyl phosphite, butyl 2-ethylhexyl phosphite, diisooctyl phosphite, diethyl phosphite, diisobutyl phosphite, dicresyl phosphite, di(2,3-dimethylphenyl)phosphite, ditolyl phosphite, dioctadecyl phosphite, cyclohexyl octyl phosphite, isooctyl phenyl phosphite, di(2-octylphenyl)phosphite, di(3 - nonylphenyl) phosphite, benzyl methyl phosphite, benzyl isopropyl phosphite, butyl cresyl phosphite, isooctyl 2-octylphenyl phosphite, 2-ethylhexyl 3-isooctylphenyl phosphite, di-2-naphthyl phosphite, di-3-phenyl phosphite, di(4-butylphenyl)phosphite, dodecyl phenyl phosphite, 4-t-butylphenyl 2-ethylhexyl phosphite, and the like.

The substituted hydroxyphenyl benzotriazole compounds which are suitable for use in the practice of the invention have the formula

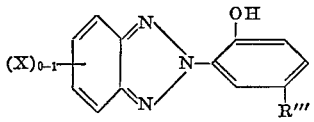

wherein R''' is an alkyl radical having from 1–20, preferably 4–12, carbon atoms, and X is halogen such as chlorine. Illustrative compounds include 2-(2'-hydroxy-5'-methylphenyl)benzotriazole;
2-(2'-hydroxy-5'-ethylphenyl)benzotriazole;
2-(2'-hydroxy-5'-propylphenyl)benzotriazole;
2-(2'-hydroxy-5'-isopropylphenyl)benzotriazole;
2-(2'-hydroxy-5'-n-butylphenyl)benzotriazole;
2-(2'-hydroxy-5'-t-butylphenyl)benzotriazole;
2-(2'-hydroxy-5'-hexylphenyl)benzotriazole;
2-(2'-hydroxy-5'-n-octylphenyl)benzotriazole;
2-[2'-hydroxy-5'-(2-ethylhexyl)phenyl]benzotriazole;
2-(2'-hydroxy-5'-dodecylphenyl)benzotriazole;
2-(2'-hydroxy-5'-t-octylphenyl)benzotriazole;
2-(2'-hydroxy-5'-eicosylphenyl)benzotriazole;
2-(2'-hydroxy-5'-t-octylphenyl)-5-chlorobenzotriazole, and the like.

As indicated, the performance characteristics of the stabilizer systems of the present invention can be increased by the presence of suitable heat stabilizers such as polysubstituted phenols, poly(alkylphenol)-substituted hydrocarbons, hydroxyphenyl polyalkylchromans, adducts of an alkylphenol and a cyclic terpene, thiobis(alkylphenol) and hydroxyphenoxy-substituted triazines such as are disclosed in U.S. Pat. 3,310,510. Representative of such hindered phenols include 2,6-di-t-butyl-4-methylphenol;
p-(3,5-di-t-butyl-4-hydroxybenzyl)phenol;
4,4'-butylidene-bis(6-t-butyl-m-cresol);
2,2'-methylene-bis(4-methyl-6-t-butyl)phenol; and
1,3,5-trimethyl-2,4,6-tris(3,5-di-t-butyl-4-hydroxybenzyl) benzene.

Other suitable phenolic thermal stabilizers are disclosed in U.S. Pat. 3,502,613 and include octadecyl[3-(3,5-di-t-butyl-4-hydroxyphenyl)]propionate;
di-n-octadecyl(3,5-di-t-butyl-4-hydroxybenzyl)phosphonate;
tetra[methylene(3,5-di-t-butyl-4-hydroxyhydrocinnamate)]methane, and the like.

The stabilizer systems of the present invention can be used in widely varying amounts, such amounts being sufficient to be effective for obtaining the improved results of this invention relative to the improvement in resistance to degradation from actinic radiation. The amount to be employed in the stabilization of organic materials is not critical and will vary depending upon the nature of the organic material, the conditions to which it is exposed and the degree of stabilization desired. Generally, the benzotriazole compound is employed in an amount such that from about 0.01 to about 5 weight percent, preferably 0.1–2.0 weight percent, based on the total weight of the polymeric material to be stabilized, is incorporated with the polymer. The amount of secondary organic phosphite ester which is incorporated with the polymer is in the range of about 0.005 to about 1 weight percent, preferably 0.02 to about 0.25 weight percent, based on the total weight of the polymeric material. When utilized, the amount of hindered phenol is in the range of about 0.005 to about 1 weight percent, preferably 0.02 to about 0.5 weight percent, based on the total weight of the polymeric material. When the additive systems of the present invention include a hindered phenol, it is preferred that the amount of benzotriazole, by weight, be in the range of 2 to 4 times the combined weight of the dialkyl phosphite and hindered phenol components.

The stabilizing systems of the present invention can be incorporated into the polymer in any conventional manner such as by dry blending the powdered additive directly with polymer pellets or fluff by means of tumble mixers, Henschel blenders and the like. Solutions or slurries of the stabilizers can be sprayed onto or stirred with a granular polymer. Suitable solvents for this purpose include acetone, benzene, cyclohexane, methyl alcohol, and the like. In general, the solvent is evaporated off before the blend is extruded, although, alternatively, the solvent-wetted polymer can be processed immediately by means of a devolatilizing extruder. Stabilizers can also be blended with a molten polymer by means of a Banbury mixer, Brabender mixer, roll mill, screw extruder, and the like, if desired.

Additional conventional additives such as fillers, pigments, other antioxidants, antistatic agents, foaming agents, other UV stabilizers, and the like can also be used as desired. In addition, inert carriers such as silica or diatomaceous earth can be employed as bulking agents and dispersing agents for the additives incorporated in the compositions of the invention.

The stabilizer combinations of the present invention lend to polymeric compositions improved stability against deterioration by ultraviolet light degradation. Thus, polymers stabilized in accordance with the invention have an extended life expectancy and can be used more effectively than unstabilized polymers for a wide diversity of uses. These polymers can be cast, extruded, rolled, or molded into sheets, rods, tubes, piping, containers, multifilaments, monofilaments, and other shaped articles, including widely used films of polymer about 0.1 to 10 mils in thickness.

The invention is further illustrated by the following examples.

Where used in the examples, the term "php." is used in its normal sense, i.e., parts by weight of additive per 100 parts by weight of base polymer.

EXAMPLE I

A sample of commercial polypropylene having a melt flow of 3-according to ASTM D 1238–62T, Condition L, and containing 0.05 php. octadecyl[3-(3,5-di-t-butyl-4-hydroxyphenyl)]propionate was divided into aliquot portions. The polymer and, where used, the additives incorporated with the polymer, was slurried in normal hexane, the solvent evaporated and the blend was masticated in a Brabender Plastograph at 200° C. for 5 minutes under a nitrogen atmosphere at a rotor speed of 50 r.p.m. The product was compression molded to form 5-mil thick films. Individual samples were exposed in a twin-enclosed carbon arc Weather-Ometer operated without the spray cycle and modified by the incorporation of eight fluorescent sun lamps.

Triplicate film samples were tested every 20 hours by subjecting each film strip to a rolling motion such that the entire length of the film strip was bent approximately 180°. Breaking or cracking indicates failure. The results are reported in Table I.

TABLE I

| Stabilizer | Php. | Avg. hrs. to failure |
|---|---|---|
| Control — Polymer | | 80 |
| Test: | | |
| 1 — 2-(2'-hydroxy-5'-t-octylphenyl)-benzotriazole. | 0.5 | 220 |
| 2 — Dioctyl phosphite | 0.1 | 113 |
| 3 — { 2-(2'-hydroxy-5'-t-octylphenyl) benzotriazole. | 0.5 } | 307 |
|     { Dioctyl phosphite | 0.1 } | |

The example demonstrates the improved stabilization which results when a polymeric material is treated in accordance with the present invention.

EXAMPLE II

Another sample of a commercial polypropylene having a melt flow of 3 and having incorporated therein 0.1 php. di-n-octadecyl(3,5-di-t-butyl-4-hydroxybenzyl)phosphonate was divided into several aliquot portions. Compositions were prepared from these several portions and tested according to the procedure of Example I. The results of these tests are reported in Table II.

TABLE II

| Stabilizer | Php. | Avg. hrs. to failure |
|---|---|---|
| Control — Polymer | | 140 |
| Test: | | |
| 4 — 2-(2'-hydroxy-3',5'-di-t-amylphenyl) benzotriazole. | 0.5 | 633 |
| 5 — { 2-(2'-hydroxy-3',5'-di-t-amylphenyl) benzotriazole. | 0.5 } | 580 |
|     { Dioctyl phosphite | 0.1 } | |

The example demonstrates the unexpected results obtained when polymeric materials are stabilized according to the present invention. It should be noted that the use of a hydroxybenzothiazole compound having an alkyl substituent in a position other than 5' in combination with a secondary organic phosphite ester adversely affects polymer stability.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A light-stable resin comprising polypropylene containing 0.05 weight percent octadecyl[3-(3,5-di-t-butyl-4-hydroxyphenyl)]propionate, 0.1 weight percent dioctyl phosphite and 0.5 weight percent 2-(2'-hydroxy-5'-t-octylphenyl)benzothiazole.

References Cited

UNITED STATES PATENTS

| 3,322,718 | 5/1967 | Jacob | 260—45.7 |
| 3,409,587 | 11/1968 | Mills | 260—45.7 |
| 3,464,943 | 9/1969 | Newland et al. | 260—45.8 |
| 3,406,143 | 10/1968 | Stacy, Jr. et al. | 260—45.8 |
| 3,624,026 | 11/1971 | Drake | 260—45.7 |
| 3,502,613 | 3/1970 | Berger | 260—45.8 |
| 3,355,422 | 11/1967 | Brindell | 260—45.8 |
| 3,368,997 | 2/1968 | Gordon | 260—45.8 |
| 3,481,897 | 12/1969 | Marinaccio et al. | 260—45.8 |
| 3,595,936 | 7/1971 | Birenzwige et al. | 260—45.7 |
| 3,424,715 | 1/1969 | Kopacki et al. | 260—45.8 |

DONALD E. CZAJA, Primary Examiner

E. C. RZUCIDLO, Assistant Examiner

U.S. Cl. X.R.

260—45.8 N, 45.95

UNITED STATES PATENT OFFICE

CERTIFICATE OF CORRECTION

Patent No. 3,781,242                                Dated: December 25, 1973

It is certified that error appears in the above-identified patent and that said Letters Patent are hereby corrected as shown below:

Column 6, line 18, "phenyl)benzothiazole" should read:

--- phenyl)benzotriazole ---.

Signed and sealed this 30th day of April 1974.

(SEAL)
Attest:

EDWARD M. FLETCHER, JR.
Attesting Officer

C. MARSHALL DANN
Commissioner of Patents